(12) United States Patent
Cliff et al.

(10) Patent No.: US 9,011,727 B2
(45) Date of Patent: *Apr. 21, 2015

(54) ELECTROCHROMIC DEVICES AND POLYMER COMPOSITIONS

(75) Inventors: Nancy Cliff, Ringwood, NJ (US); David Yale, Bethel, CT (US); Deanna Rodovsky, Seattle, WA (US); Jennifer Jankauskas, Putnam Valley, NY (US)

(73) Assignee: BASF SE, Ludwigshafen (DE)

( * ) Notice: Subject to any disclaimer, the term of this patent is extended or adjusted under 35 U.S.C. 154(b) by 1034 days.

This patent is subject to a terminal disclaimer.

(21) Appl. No.: 12/384,608

(22) Filed: Apr. 7, 2009

(65) Prior Publication Data

US 2010/0090169 A1    Apr. 15, 2010

Related U.S. Application Data

(60) Provisional application No. 61/125,298, filed on Apr. 24, 2008, provisional application No. 61/123,470, filed on Apr. 9, 2008.

(51) Int. Cl.
| | | |
|---|---|---|
| *G02F 1/15* | (2006.01) | |
| *G02F 1/153* | (2006.01) | |
| *C09K 9/02* | (2006.01) | |
| *C08L 65/00* | (2006.01) | |

(52) U.S. Cl.
CPC .......... *G02F 1/15* (2013.01); *C08G 2261/1424* (2013.01); *C08G 2261/3221* (2013.01); *C08L 65/00* (2013.01); *C09K 9/02* (2013.01); *C09K 2211/1466* (2013.01); *G02F 1/1533* (2013.01); *G02F 2001/1515* (2013.01); *G02F 2202/022* (2013.01)

(58) Field of Classification Search
CPC ... G02F 1/15; G02F 1/1533; G02F 2202/022; G02F 2001/1515; C09K 9/02; C09K 2211/1466; C08G 2261/1424; C08G 2261/3221; C08L 65/00
USPC .............. 252/500, 510, 511, 518.1, 583, 584, 252/586
See application file for complete search history.

(56) References Cited

U.S. PATENT DOCUMENTS

| | | | |
|---|---|---|---|
| 4,697,000 A | 9/1987 | Witucki et al. | |
| 4,902,108 A | 2/1990 | Byker | |
| 5,413,739 A | 5/1995 | Coleman | |
| 5,446,577 A | 8/1995 | Bennett et al. | |
| 5,500,759 A | 3/1996 | Coleman | |
| 5,812,300 A * | 9/1998 | Coleman | 359/265 |
| 5,995,273 A | 11/1999 | Chandrasekhar | |
| 6,178,034 B1 | 1/2001 | Allemand et al. | |
| 6,791,738 B2 * | 9/2004 | Reynolds et al. | 359/265 |
| 2003/0174377 A1 | 9/2003 | Reynolds et al. | |
| 2004/0061097 A1 * | 4/2004 | Kloeppner et al. | 252/583 |
| 2006/0036474 A9 * | 2/2006 | Brugger et al. | 705/5 |
| 2006/0077511 A1 * | 4/2006 | Poll et al. | 359/265 |
| 2007/0270571 A1 * | 11/2007 | Reynolds et al. | 528/373 |

FOREIGN PATENT DOCUMENTS

| | | |
|---|---|---|
| JP | 07207260 | 2/1997 |
| JP | 63208089 | 8/1998 |
| WO | 9415246 | 7/1994 |
| WO | 9813724 | 4/1998 |

OTHER PUBLICATIONS

Shalin (Polymer Matrix Composites 1995 Chapman & Hall, London UK, p. 206).*
PCT International Search Report dated Jul. 7, 2009.

* cited by examiner

*Primary Examiner* — Patrick Ryan
*Assistant Examiner* — Aaron Greso
(74) *Attorney, Agent, or Firm* — Shiela Loggins

(57) ABSTRACT

Blending an electrically active, anodically coloring, electrochromic polymer with a non-electrochromic, non-electrically conductive binder polymer greatly enhances the performance of the anodically coloring, electrochromic polymer in an electrochromic device over time. In addition to improved physical characteristics of the blend, e.g., film build, durability etc, the coloristic properties, including color space and color strength, of the device comprising the blend are more durable than when using the neat polymer, and in certain instances, the color space and color intensity provided by the blend is superior to that available from the neat polymer.

14 Claims, No Drawings

ELECTROCHROMIC DEVICES AND POLYMER COMPOSITIONS

This application claims benefit under 35 USC 119(e) of U.S. provisional application Ser. No. 61/125,298 filed Apr. 24, 2008 and U.S. provisional application Ser. No. 61/123,470 filed Apr. 9, 2008, the disclosures of which are incorporated herein in their entirety by reference.

Electrochromic devices comprising as an electroactive color changing component, for example a color changing layer, an anodically coloring, electrochromic composition with improved color characteristics and durability, comprising an electrically active, anodically coloring polymer and a non-electrically conductive polymer is provided. The compositions exhibit improved physical properties, including greater adhesion to electrodes and other surfaces, and enhanced retention of electroactive properties, including response to applied electric potential such as electrochromic activity. Surprisingly, it is found that the color properties of the electrochromic polymer can be enhanced by blending electroactive, anodically coloring polymers, such as certain polypyrroles, for example, a poly 3,4-dialkoxypyrrole, with non-conducting polymers, such as polymers used in traditional coating applications including acrylates and polyesters etc. That is, broader color space and greater color strength or intensity is maintained during use and in certain cases, the color space and/or color strength made available by the blends is greater than that available from the anodically coloring, electrochromic polymers when used alone.

BACKGROUND OF THE INVENTION

Electroactive polymers have attracted a great deal of attention due to their promising applications as functional materials for conductive materials, light-emitting diodes, electrochromic devices, field effect transistors, photovoltaic devices, batteries, antistats etc. One important class of inherently conductive or electroactive polymers are electrochromic polymers.

Electrochromic devices are well known, e.g., U.S. Pat. Nos. 4,902,108 and 6,178,034, incorporated herein in their entirety by reference. Such devices undergo a change in electromagnetic radiation transmission upon application of an electrical stimulus and have found use in a number of commercial applications. For example, they may be employed in glazings, e.g., energy efficient and privacy windows for architectural or automotive use, automotive rearview mirrors, displays, filters, eyewear, antidazzle and fog penetrating devices, and other applications where variable light transmission is desired.

Electrochromic devices are typically associated with a noticeable change in color. Changes in other optical properties, such as in the degree of clarity and opacity and absorption in the IR, are also characteristics of such devices.

In electrochromic materials, electrochemical oxidation or reduction induces a reversible change in the reflected or transmitted light. Electrochromic properties have proved especially useful in the construction of mirrors, displays, windows etc where the transparency or color of the article is altered by applying or altering an applied electrical voltage. Commercial devices include rear view mirrors that darken at night to prevent glare from headlights, or windows that darken to reduce transmitted sunlight or to provide privacy.

Many electrochromic devices have been produced using inorganic compounds like tungsten trioxide and iridium dioxide, but organic compounds continue to find increasing use as electrochromic materials such as viologens, metallophthalocyanines and conducting polymers. Advantages of organic materials include different electronic spectra, and therefore different colors, the possibility of lower processing costs and enhanced electrochromic contrast and switching speed. In addition, organic materials can more easily be fashioned into flexible devices such as would be used in electronic paper or other such applications.

Electrochromic materials include compounds that change from one color to another with applied voltage as well as compounds that change from transparent or clear to opaque or colored. The change from clear to colored can occur when a material is electrochemically oxidized, anodically coloring, or when the material is electrochemically reduced, cathodically coloring. The reverse reaction, for example back to clear, should occur when the electrical impulse is removed or reversed.

The terms "anodically coloring" and "cathodically coloring" typically refer to materials which are either lightly colored, colorless or nearly colorless in their neutral state, however more than one color may be formed depending on the applied voltage. For example, an anodically coloring polymer may turn from colorless to red upon application of a particular voltage and the same polymer may then turn from red to, for example, green upon increasing the voltage. Such a polymer is considered anodically coloring because it is clear or lightly colored in its neutral state.

U.S. Pat. No. 6,791,738, incorporated herein in its entirety by reference, provides electrochromic polymers and devices. In particular, anodically coloring polymers having a band gap >3 eV in the neutral state and oxidation potential <0.5 vs a saturated calomel electrode, such as poly 3,4-dialkoxypyrroles, are provided.

Being as co-polymers are a subset of polymers, when used herein "polymers" is a term including both co-polymers and homo-polymers.

Witucki, et. al., U.S. Pat. No. 4,697,000 disclose the production of electronically conductive polypyrroles, which may be co-polymers of variously substituted pyrrole repeating units.

U.S. Pat. No. 5,446,577, incorporated herein in its entirety by reference, discloses display devices comprising a transparent outer layer, a first electrode, which is ion-permeable, having a reflective surface facing the transparent layer, an electrochromic material, preferably a conductive polymer such, as polyaniline, located between the reflective surface and the outer transparent layer, an electrolyte in contact with the electrochromic material and a second electrode located behind the first electrode. The display devices are capable of changing reflectance and/or color by the application of an electric potential to the electrodes.

U.S. Pat. No. 5,995,273, incorporated herein in its entirety by reference, discloses an electrochromic display device having an electrochromic conducting polymer layer in contact with a flexible outer layer; a conductive reflective layer disposed between the electrochromic conducting polymer and a substrate layer; and a liquid or solid electrolyte contacting the conductive reflective layer and a counter electrode in the device.

Inherently conductive materials based on organic polymers offer many advantages over metal or other inorganic materials in electrochromic devices. For example, polymers are often more readily processed providing improvements in device construction. Many conductive polymers are handled easily in air and can be molded or processed using conventional techniques well known in conventional plastic and coating applications. Soluble polymers can be applied as a coating or via an ink jet or standard lithography process.

However, there are also potential disadvantages in using conductive polymers. Often, the polymer must remain in contact with an electrode or other surface. As with inks and coatings, adhesion to the surface must be attained and retained. Poor contact with, for example, an electrode, or subsequent delaminating will negatively impact or negate the desired electrochromic behavior. Further, many electrochromic applications place electrochromic polymer in the presence of electrolyte systems which may include aggressive solvents. The same solubility characteristics that allow a polymer to be applied as a coating may also result in a greater degree of polymer dissolution or delamination.

Many anodically coloring polymers face an additional problem in that the intensity or color strength of the colors that are formed upon voltage application or variation is not particularly strong, particularly when compared with the colors produced using cathodically coloring polymers.

Any attempt to improve the performance of electrochromic polymers, for example, the adhesion or color strength of the polymer, must not impact the characteristics of the polymer that make it valuable. For example, fast switching times, color space and sharp differentiation between the electrically oxidized or reduced forms of electrochromic materials can not suffer as a consequence of improved electrode adhesion.

It has been found that blending electrochromic, anodically coloring polymers with non-electrically conducting binder polymers not only improves film forming properties and durability, but also enhances both the color space available to the polymer and the intensity of the colors formed upon the variation of applied voltage, particularly after repeated switching, without adversely effecting the switching speeds (time to complete the color change) of the polymers. In certain cases, the color space and/or intensity available from the inventive blend, even upon initial switching, exceeds that available from the electrochromic polymer when used alone.

SUMMARY OF THE INVENTION

The invention provides a method to enhance the color strength and color space produced by anodically coloring polymers when subjected to applied voltage or the variation of applied voltage in an electrochromic device. The compositions comprising the anodically coloring polymers and binder polymers made in accordance with the method allow control over the color, brightness, and environmental stability of, for example, an electrochromic window. In addition, high device contrast ratios, high transmittance changes, and high luminance changes can be achieved along with rapid switching times for full color change. Also provided are transmissive or reflective electrochromic devices comprising the compositions such as displays, including signage, billboards, video monitors, scoreboards, announcement boards warning systems etc, electrochromic windows including temperature control windows, sunscreens, privacy windows, auto mirrors, sunroofs, skylights etc, electronic books, and electrical wiring. The invention also provides for the use of complementary electrochromic polymers in the manufacture of electrochromic devices. In a specific embodiment, two complementary polymers can be matched and incorporated into dual polymer electrochromic devices.

DESCRIPTION OF THE INVENTION

A method for improving the coloristic properties of electrochromic, anodically coloring polymers by blending with a non-conductive binder polymer is provided. The method allows for the preparation of anodically coloring polymer films with excellent physical properties and excellent response to applied voltage.

An anodically coloring electrochromic composition with improved color characteristics and durability is provided, comprising an electrically active, anodically coloring polymer and a non-electrically conductive binder polymer is provided.

An electrochromic device comprising as an electroactive color changing component an anodically coloring, electrochromic composition with improved color characteristics and durability, which composition comprises an electrochromic, anodically coloring polymer and a non-electrically conductive binder polymer in a single layer is provided.

While it is generically known that one can blend non-conductive polymers in general with conductive polymers, the improvement in coloristic properties of anodically coloring polymers provided by the invention is hitherto unknown and completely unexpected.

Therefore, the present invention provides a novel method for improving coloristic properties of anodically coloring electrochromic polymers by preparing compositions also containing binder polymers and electrochromic devices containing these compositions. Also provided are anodically coloring compositions which are themselves novel per se.

One embodiment of the invention relates to the enhancement of the color space and/or color strength obtained by preparing certain inventive compositions. Another embodiment relates to the enhanced color space and/or color strength observed after repeated switching of the device prepared using the inventive composition as compared with that observed after repeated switching of a device prepared using the anodically coloring polymer alone instead of the blend.

The anodically coloring polymers of the invention are, for example, polymers that change from being clear, colorless or nearly colorless in the neutral state to colored upon being oxidized by the application of an electrical voltage. The anodically coloring polymers of the invention may also change from one color to another color upon further oxidation by the application of increased voltage. The colors involved in the invention can be deep colors, as in dark or richly colored systems, or can be relatively light as in slightly coloring systems For example, the anodically coloring polymers of the invention are polyaniline, polyphenylenediamines and polypyrroles which change color upon being oxidized by applied electrical voltage, for example, polyaniline, substituted polyphenylenediamines and polypyrroles that change from being nearly colorless in the neutral state to colored upon oxidation. When the voltage is reversed the compositions of the invention return to their neutral state.

In one embodiment of the invention, the anodically coloring polymers are poly pyrrole polymers that change from colorless or nearly colorless to colored or from a lightly colored material to more intensely colored material of the same hue or of a different hue when electrochemically oxidized. For example the anodically coloring polymers contain as a repeating unit a substituted or unsubstituted pyrrole moiety, for example a 3,4-dialkoxypyrrole moiety. For example, the pyrrole polymer contains a moiety of one or more of the following general formulae:

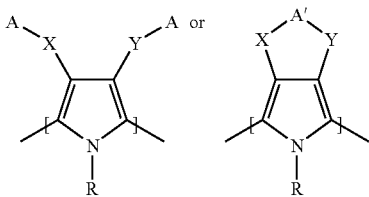

wherein X and Y are independently of each other an oxygen atom, sulfur atom or a group NR, typically X and Y are each oxygen, each R and each A is independently H, alkyl, interrupted and/or substituted alkyl and A' is alkylene or interrupted and/or substituted alkylene.

For example, "alkyl, interrupted and/or substituted alkyl" is unsubstituted alkyl; or alkyl interrupted by one or more ether, ester, amino or amido linkages, such as a polyether, e.g., propylene glycol or ethylene glycol; or alkyl or interrupted alkyl substituted by, for example, one or more of an aromatic or heteroaromatic ring, such as phenyl or substituted phenyl, OH, OAcyl, O-alkyl, amino, amido, CN, halogen, salts and other commonly occurring substituents; and A' is alkylene, for example $C_{1-12}$ alkylene, which may be interrupted and or substituted as for R or A.

For example, the pyrrole polymer contains a moiety above wherein each R is independently a $C_{1-24}$ alkyl group which may be substituted and/or interrupted as above and each A is independently H or $C_{1-24}$ alkyl group which may be substituted and/or interrupted as above and A' is a $C_{1-12}$ alkylene group or $C_{1-6}$ alkylene group which may be substituted and or interrupted as above.

In one embodiment, X=Y=O,

R is $C_{1-24}$ alkyl or alkyl interrupted by one or more oxygen atoms or carbonyl, ester, amino or amido linkages, which alkyl or interrupted alkyl may also be substituted one or more times by one or more aromatic or heterocyclic ring, OH, OAcyl, O-alkyl, amino, amido, CN, halogen, COOH, carboxylic ester, amino salt, carboxylate salt or phosphorous salt, each A is independently H, $C_{1-24}$ alkyl or alkyl interrupted by one or more oxygen atoms or carbonyl, ester, amino or amido linkages, which alkyl or interrupted alkyl may also be substituted one or more times by one or more aromatic or heterocyclic ring, OH, OAcyl, O-alkyl, amino, amido, CN, halogen, COOH, carboxylic ester, amino salt, carboxylate salt or phosphorous salt and A' is $C_{1-6}$ alkylene or alkylene interrupted and/or substituted as for A.

Alkyl may be branched or unbranched alkyl and obviously $C_1$ alkyl or alkylene is not interrupted but may be substituted.

When one or each A is a hydrogen atom or alkyl substituted by hydroxyl or amino, the pyrrole polymer can graft onto or otherwise react into the non-conductive binder polymer which may in some cases improve the overall performance or permanence of the composition. The same may happen if R is alkyl substituted by hydroxyl or amino or if A' is substituted by hydroxyl or amino.

Ester, amino or amido linkages represent interruptions in the alkyl chain by —COO—, —NH—N($C_{1-24}$ alkyl)'- or —N(CO)— groups, OAcyl or O-alkyl substituents include ester or ether groups substituted by $C_{1-24}$ alkyl and amino or amido includes amine or amide groups substituted by H or $C_{1-24}$ alkyl.

In one embodiment of the invention the anodically coloring polymers are the anodically coloring polymers and co-polymers having a band gap >3 eV in the neutral state and oxidation potential <0.5 vs a saturated calomel electrode of U.S. Pat. No. 6,791,738, already incorporated in its entirety by reference. For example, the anodically coloring polymers are the poly 3,4-dialkoxypyrroles of U.S. Pat. No. 6,791,738.

More than one anodically coloring polymer may be present.

The binder polymer is a non-electrically conductive organic polymer such as a thermoplastic, elastomeric or thermoset polymer which polymer may be crosslinked. Such polymers are well known, common items of commerce and can be found for example in copending U.S. application Ser. No. 11/978,764, the relevant portions of which are incorporated herein by reference.

Typically, the binder polymer is a "coating polymer", that is, a polymer typically encountered as part of a coating system or paint, such as coatings for automobiles, appliances, wood, plastic articles, paper, glass etc.

Typically, the binder polymer can in principle be any binder customary in industry, for example those described in Ullmann's Encyclopedia of Industrial Chemistry, 5th Edition, Vol. A18, pp. 368-426, VCH, Weinheim 1991. In general, it is a film-forming binder based on a thermoplastic or thermosetting resin, predominantly on a thermosetting resin. Examples thereof are alkyd, acrylic, acrylamide, polyester, styrenic, phenolic, melamine, epoxy and polyurethane resins.

For example, non-limiting examples of common coating binders useful in the present invention include silicon containing polymers, fluorinated polymers, unsaturated and saturated polyesters, unsaturated and saturated polyamides, polyimides, crosslinkable acrylic resins derived from substituted acrylic esters, e.g. from epoxy acrylates, urethane acrylates, polyester acrylates, polymers of vinyl acetate, vinyl alcohol and vinyl amine. The binder polymers may be co-polymers, polymer blends or composites.

Binder polymers are frequently crosslinked with, for example, melamine resins, urea resins, isocyanates, isocyanurates, polyisocyanates, epoxy resins, anhydrides including maleic anhydride, poly acids, biuret, siloxanes and amines, with or without accelerators.

When a crosslinked is used in the invention the amount of crosslinking agent relative to binder polymer will vary widely depending on the binder and the amount of flexibility desired for the resulting layer. For example, the binder composition may contain up to 50% by weight of crosslinker based on the combined weight of the bider polymer and crosslinker or as little as 0.1%. Generally however, when using a crosslinked binder, the amount of crosslinker will range from about 5% to about 50% based on the combined weight of binder polymer and crosslinker, often from 5 to 40%.

The binder can be a cold-curable or hot-curable binder; the addition of a curing catalyst may be advantageous. Suitable catalysts which accelerate curing of the binder are described, for example, in Ullmann's Encyclopedia of Industrial Chemistry, Vol. A18, p. 469, VCH Verlags-gesellschaft, Weinheim 1991.

The binder may be a surface coating resin which dries in the air or hardens at room temperature. Exemplary of such binders are nitrocellulose, polyvinyl acetate, polyvinyl chloride, unsaturated polyester resins, polyacrylates, polyurethanes, epoxy resins, phenolic resins, and especially alkyd resins. The binder may also be a mixture of different surface coating resins. Provided the binders are curable binders, they are normally used together with a hardener and/or accelerator.

Examples of coating compositions useful in the invention containing specific binders are:
1. coatings based on cold- or hot-crosslinkable alkyd, acrylate, polyester, polyether, epoxy, caramate or melamine resins or mixtures of such resins,
2. two-component polyurethane coatings based on hydroxyl-containing acrylate, polyester or polyether resins and aliphatic or aromatic isocyanates, isocyanurates or polyisocyanates;
3. one-component polyurethane coatings based on blocked isocyanates, isocyanurates or polyisocyanates which are deblocked during baking, if desired with addition of a melamine resin;
4. one-component polyurethane coatings based on a Tris-alkoxycarbonyltriazine crosslinker and a hydroxyl group containing resin such as acrylate, polyester or polyether resins;
5. one-component polyurethane coatings based on aliphatic or aromatic urethaneacrylates or polyurethaneacrylates having free amino groups within the urethane structure and melamine resins or polyether resins, if necessary with curing catalyst;
6. two-component coatings based on (poly)ketimines and aliphatic or aromatic isocyanates, isocyanurates or polyisocyanates;
7. two-component coatings based on (poly)ketimines and an unsaturated acrylate resin or a polyacetoacetate resin or a methacrylamidoglycolate methyl ester;
8. two-component coatings based on carboxyl- or amino-containing polyacrylates and polyepoxides;
9. two-component coatings based on acrylate resins containing anhydride groups and on a polyhydroxy or polyamino component;
10. two-component coatings based on acrylate-containing anhydrides and polyepoxides;
11. two-component coatings based on (poly)oxazolines and acrylate resins containing anhydride groups, or unsaturated acrylate resins, or aliphatic or aromatic isocyanates, isocyanurates or polyisocyanates;
12. two-component coatings based on unsaturated polyacrylates and polymalonates;
13. thermoplastic polyacrylate coatings based on thermoplastic acrylate resins or externally crosslinking acrylate resins in combination with etherified melamine resins;
14. paint systems based on siloxane-modified or fluorine-modified acrylate resins;
15. polyacrylamides and polyacrylates.

The coating composition can also comprise further components, examples being solvents, pigments, dyes, plasticizers, stabilizers, thixotropic agents, drying catalysts and/or levelling agents. Examples of possible components are those described in Ullmann's Encyclopedia of Industrial Chemistry, 5th Edition, Vol. A18, pp. 429-471, VCH, Weinheim 1991.

Possible drying catalysts or curing catalysts are, for example, organometallic compounds, amines, amino-containing resins and/or phosphines. Also, acids and acid-containing resins.

Examples of organometallic compounds are metal carboxylates, especially those of the metals Sn, Pb, Mn, Co, Zn, Zr or Cu, or metal chelates, especially those of the metals Sn, Zn, Al, Ti or Zr, or organometallic compounds such as organotin compounds, for example.

Examples of metal carboxylates are the stearates of Pb, Mn or Zn, the octoates of Co, Zn or Cu, the naphthenates of Mn and Co or the corresponding linoleates, resinates or tallates.

Examples of metal chelates are the aluminium, titanium or zirconium chelates of acetylacetone, ethyl acetylacetate, salicylaldehyde, salicylaldoxime, o-hydroxyacetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyldiethanolamine, N-dimethylethanolamine, N-ethylmorpholine, N-methylmorpholine or diazabicyclooctane (triethylenediamine) and salts thereof. Further examples are quaternary ammonium salts, for example trimethylbenzylammonium chloride.

Amino-containing resins are simultaneously binder and curing catalyst. Examples thereof are amino-containing acrylate copolymers. Amine catalysts may also include latent or blocked amines.

The curing catalyst used can also be a phosphine, for example triphenylphosphine.

Examples of acid catalysts include organic and inorganic acid catalysts which may also be blocked or latent acids. Examples of organic acids include sulfonic acid catalysts, blocked sulfonic acid catalysts, carboxylic acids, phosphorous acid, blocked phosphorous acid, phosphonic acid, acid phosphates, triflic acid, etc. The class of acid catalysts includes both strong and weak acids.

Blocked, or latent, acid catalysts may be blocked with a volatile amine, oxime, or other agent Examples of inorganic acid catalysts include hydrochloric acid, nitric acid.

The coating compositions can also be radiation-curable coating compositions. In this case, the binder essentially comprises monomeric or oligomeric compounds containing ethylenically unsaturated bonds, which after application are cured by actinic radiation, i.e. converted into a crosslinked, high molecular weight form. Where the system is UV-curing, it generally contains a photoinitiator as well. Corresponding systems are described in the abovementioned publication Ullmann's Encyclopedia of Industrial Chemistry, 5th Edition, Vol. A18, pages 451-453. In radiation-curable coating compositions, the novel stabilizers can also be employed without the addition of sterically hindered amines.

The coating may also be a radiation-curable, solvent-free formulation of photopolymerisable compounds. Illustrative examples are mixtures of acrylates or methacrylates, unsaturated polyester/styrene mixtures or mixtures of other ethylenically unsaturated monomers or oligomers.

The coating compositions can comprise an organic solvent or solvent mixture in which the binder is soluble. The coating composition can otherwise be an aqueous solution or dispersion. The vehicle can also be a mixture of organic solvent and water. The coating composition may be a high-solids paint or can be solvent-free (e.g. a powder coating material). Powder coatings are, for example, those described in Ullmann's Encyclopedia of Industrial Chemistry, 5th Ed., A18, pages 438-444. The powder coating material may also have the form of a powder-slurry (dispersion of the powder preferably in water).

The binder polymer is, for example, selected from acrylate, acrylamide polyether, polyester, polyamide, polyurethane, polyolefin, polyvinyl alcohol, epoxy and fluoropolymer resins including co-polymeric resins, for example, acrylates, polyethers, polyesters and polyvinyl alcohols, for example, acrylates, polyethers and polyesters, including crosslinked polymers such as crosslinked systems comprising any of the preceding resins, for example any of the preceding resins crosslinked with melamine, an isocyanates, an aldehyde, aldehyde equivalent or polyaldehyde, a polyalcohol, polyamine or polyalcohol or polyamine functionalized with acrylic acid or methacrylic acid, an isocyanate, for example an acrylate, polyether or polyester crosslinked with melamine or an isocyanate.

In one embodiment of the invention the binder polymer is neither electrically conducting nor ionically conducting, for example, a crosslinked or non-crosslinked acrylate or polyester.

In one embodiment of the invention the non-electrically conducting binder polymer is ionically conducting, for example, a crosslinked or non-crosslinked polyether or a crosslinked or non-crosslinked polymer comprising polyether segments along with ester, amide or urethane moieties.

In one embodiment, the binder polymer is part of water born coating, that is a polymer that is water soluble or present in water as a latex or dispersion. For example, a polyacrylate, polyacrylamide, polyester or polyvinyl alcohol solution, latex or dispersion, for example, a polyacrylate, polyacrylamide or polyester solution, latex or dispersion, for example, a polyacrylate solution or dispersion.

The different polymers of the invention are combined using any standard processing steps for polymer resins and coating formulations. For example, the electrochromic polymer and binder polymer be dry blended or dissolved in a solvent or solvents. In one embodiment, water or an aqueous mixture is the solvent. A solution or dispersion of one polymer may be mixed with a solution or dispersion of another, or one polymer as a single component may be blended with a solution or dispersion of another polymer.

It is also possible to further process the polymer blend using techniques common in thermoplastic processing such as extrusion, compression molding, Brabender melt processing, other molding and film forming processes etc.

Typically however, the polymer blend will be mixed and incorporated into the electrochromic device using techniques practiced in coatings technology, for example, the preparation of a coating formulation that comprises a solution or dispersion of the polymers in a solvent which is then applied to the appropriate component of the electrochromic devise, for example, the surface of an electrode by spraying e.g., via air brush, spin coating, drop coating, drawdown, brushing, dipping or any other standard coating application technique. Ink jet techniques can also be used in applying the composition of the invention.

If crosslinking of the binder polymer is desired, the crosslinking can take place at any point in the process, for example, an already crosslinked polymer may be used in the initial dispersion or in preparing the coating formulating, or the polymer may be crosslinked after application of the coating formulation to the desired component of the electrochromic devise.

The concentration of the polymers in the thus prepared coating formulation may be somewhat more dilute than typically encountered in standard coating operations due to the stringent demands on the resulting film quality and the physical properties of the electrochromic polymer.

The coating formulation containing the electrochromic polymer and the binder polymer may also be applied in the form of a slurry or powder.

Drying or curing the coating formulation after application to the appropriate component of the electrochromic devise can be accomplished by any standard means appropriate to the formulation components, for example, simply allowing the applied formulation sit at room temperature under standard environmental conditions, heating may be applied, reduced pressure may be used, exposing the formulation to electrochemical radiation, application of a further curing agent or catalyst etc.

More than one binder polymer or electrochromic polymer may be present in the thus form blend.

The relative amount of anodically coloring polymer and binder polymer can vary widely, for example 1:99 to 99:1, however, the amount of binder polymer is generally at least 10%. For example, the ratio of electrochromic polymer to binder polymer is from about 5:95 to about 95:5, or from about 10:90 to 90:10, for example from about 20:80 to about 80:20 for example, 40:60 to 60:40, or 50:50.

Because of the surprising efficiency and performance of the electrochromic compositions of the invention, compositions containing higher amounts of binder polymer are readily used. For example, excellent results are achieved using a ratio of electrochromic polymer to binder polymer of from about 1:99 to about 50:50, or from about 5:95 to about 50:50, for example from about 10:90 to about 50:50, for example from about 20:80 to about 50:50.

In one embodiment of the invention the amount of binder polymer exceeds the amount of electrochromic polymer, for example the composition comprises more than 50%, for example 55% or more, or 60% or more, for example 75% or more, or 90% or more or 95% or more of binder polymer relative to the total amount of electrochromic and binder polymer. Excellent results are achieved with ratios of anodically coloring polymer to binder polymer of 25:75 to 50:50. All ratios are weight:weight ratios.

When using an electrochromic polymer alone, there are often physical limits as to how thick a film one can produce, as well as performance limits relating to film build. For example, switching can become very inefficient when using thicker films made of electrochromic polymers. Both of these issues are addressed by the present invention.

For example, coherent films of greater than 1 micron that are durable, adhesive and/or have sufficiently rapid switching speeds are difficult to prepare using certain polypyrroles alone, such as certain 3,4 dialkoxy polypyrroles.

One advantage of the invention is that mixing the binder polymer with the electrically active, and generally more expensive anodically coloring polymer, allows one to produce a much thicker film which is more robust and adherent than films of the anodically coloring polymer alone. It is also possible to produce thicker films wherein more electrochromic polymer can be incorporated into the film than when using the electrochromic polymer alone. For example, it may be possible to produce effective films of certain electrochromic polymers of 0.1 to 0.5 micron or less, however, the present invention allows one to prepare, for example, an effective film that is more than 1 micron thick, often much more than 1 micron thick comprising 50% or more of the electrochromic polymer.

More than one color can be obtained by varying the voltage applied to the polymer. That is, in many systems comprising the anodically coloring polymers, different hues are obtained at different voltages. This is probably related to the formation of more fully oxidized species.

Significantly, the color space and color strength of the inventive blend is maintained much longer than when using the anodically coloring polymers alone, that is, the color changing characters of the inventive blend are far more durable after repeated switching.

One surprising advantage of the invention is that the films produced using the blend of binder polymer and anodically coloring polymer in certain cases produce a wider available color space, that is, when changing the voltage, a wider range of hue changes are available to the blend than are observed when using just the anodically coloring polymer.

Another surprising advantage of the invention is that the films produced using the blend of binder polymer and anodically coloring polymer in certain cases produce color changes of stronger intensity from the anodically coloring polymer. That is, one might expect that to obtain the same color strength from a film prepared from, for example, a 1:1 blend of binder polymer and anodically coloring polymer as seen from a film prepared from only the anodically coloring polymer, one would have to use twice the amount of the blend, thus getting a film with the same amount of color forming polymer. For example, assuming the same film density, one might expect that a 1 micron film prepared from the 1:1 blend would generate the same color strength obtained from a 0.5 micron film of neat anodically coloring polymer. In many cases however, the film of the invention produces greater color strength based on the amount anodically coloring polymer present, thus the 1 micron film of a 1:1 blend will provide greater color strength than a 0.5 micron film of neat polymer.

Thus, the same amount of polymer, or even less polymer, may produce a greater amount of color, i.e., a greater color intensity, when diluted in the film by the binder polymer, which is especially noticeable after repeated switching.

Less of the expensive, electrically active, anodically coloring polymer can therefore be used in many applications to generate the desired color change.

The compositions of the present invention maintain the quick switching speeds of the electrochromic polymer when used alone. Notably, the present invention allows for rapid switching even when using thicker film builds, which, as mentioned above, is often problematic when using the electrochromic polymer alone. The compositions are therefore ideal for use in electrochromic devices.

An electrochromic device of the invention comprises, for example,
i) an electrode
ii) an anodically coloring electrochromic composition of the invention
iii) an electrolyte
iv) optionally a second electrochromic composition
v) an electrode.

The present anodically coloring compositions may be the only color changing component of the device or additional layer or layers comprising other electrochomic compositions may be present. For maximum color contrast in a device, a second electrochromic composition may be present such as a separate cathodically coloring layer associated with electrode opposite the electrode associated with the inventive composition. Thus, each electrode has a complimentary electrochromic material associated with it and the combined combination of colors can be advantageously used to garner maximum contrast in color and/or opacity upon application of voltage. The electrochromic component in the second optional electrochromic composition can be any inorganic or organic composition employed in the art. In one embodiment the cathodically coloring composition comprises an electrochromic polymer, for example, a thiophene polymer, for example an alkoxy or dialkoxy substituted thiophene polymer such as poly-3,4 dialkoxy thiophene such as PEDOT.

The invention therefore in addition to overcoming the lack of color strength associated with many anodically coloring polymers, among other things, provides for greater efficiency in the use of anodically coloring polymers, provides a greater color space for anodically coloring polymers, allows for thicker anodically coloring polymer compositions, such as films, provides for more robust anodically coloring polymer compositions and greater adhesion to surfaces such as electrodes, allows for a wider choice of electrolyte in the electrochromic device comprising a anodically coloring polymer, provides for more durable electrochromic devises and allows for more flexibility in the design of electrochemical devises.

EXAMPLES

General Procedures

Manufacture of a rudimentary device for evaluation of color and switching durability:
"Unformulated Films"

Anodically coloring electroactive polymer is dissolved in a typical coating solvent such as toluene or butyl acetate at a concentration within the range of complete solubilization—usually between 1% and 10% by weight (pbw). The solution is stirred for several hours to ensure solubilization. The polymer solution is then applied via drop casting, spin coating, or spray casting, depending on the intended test and the measurement to be obtained, to a clean ITO-coated glass slide, typically of dimensions 7 mm×20 mm, and of low resistivity (e.g. DELTA TECHNOLOGIES C-G-501N-CUV). The solvent is allowed to evaporate at ambient temperature until the film is "set", and then the coated slide is annealed at from 120 to 140° C. under atmospheric conditions, for 30 minutes. The amount of polymer solution applied is adjusted to achieve a dry film thickness of approximately 0.5 microns.
"Formulated Films", i.e. Film Blends of the Invention To a solution of the electrochromic polymer prepared as above is added the binder polymer resin or mixture of resins and the mixture is stirred for several hours, or overnight. A crosslinking agent, if desired, may be added at any time prior to application of the coating. Shortly before application a catalyst, if desired, is added and the polymer mixture thus obtained is applied as above.

Several coated slides are produced using various spin conditions in order to achieve a film with the desired thickness. The coating is annealed in air at 120° C. for 30 minutes. All coatings are allowed to equilibrate at room temperature at least overnight before electrochemical testing is done.

Prior to obtaining electrochromic activity data, the films are measured and "matched" so that equivalent samples of formulated and unformulated films can be prepared. For example, Film thickness and approximate roughness of the slides is determined via profilometry. Electroactive polymer content is determined via absorption spectroscopy—films of equivalent EA polymer content should exhibit the same absorptivity of the pi-pi* band absorption for the neutral EA polymer.
Devices and Testing A rudimentary device comprises a quartz cuvette containing electrolyte solution and equipped with a Teflon top that allows the secure positioning of the coated ITO slide, a platinum wire coil counter electrode, and a polished silver wire pseudo reference electrode.

The "matched" slides coated with formulated and unformulated polymer are placed in individual "devices", i.e., the above cuvettes, and submitted to the following procedures:

The polymer coated slides are first soaked for 30 minutes in the electrolyte solution. The electroactive polymer is then subjected to conditioning by cyclic voltammetry, for example, using scan rates of 10 millivolts per second from −0.5 to +0.8 volts vs a silver wire pseudo reference electrode.

The conditioning is continued until the cyclic voltammograms overlap with repeated cycling. Additional cyclic voltammograms may be generated, e.g, at 50 mv/sec and 100 mv/sec.

To determine cycling lifetime, the sample is subjected to continuous cyclic voltammograms at 100 mv/sec for 6 hours, or until the sample fails. Failure consists of either delamination of the film, or reduction of the peak oxidation current magnitude of 50% or greater.

Alternatively, to assess cycling lifetime, the sample is subjected to a continuous series of potential square waves, wherein the applied potential is repeatedly alternated between an oxidizing potential and a neutralizing potential. The length of time the sample is held at each potential may vary from fractions of a second to minutes, and the number of cycles may be from 10 to 10's of thousands of cycles. The lifetime may be assessed by comparison of either charge density or peak current density before and after a given number of cycles. Alternatively, the lifetime may be expressed as number of cycles required to induce a percentage or absolute loss of current density or charge density in a sample.

Example 1

Using the above general procedure, slides coated with approx 0.5 microns thick unformulated films of poly N-(2-ethylhexyl)-3,4-dioxypropylenepyrrole, also called 2-ethylhexyl polyProDOP or Poly ProDOP N-Ethyl Hexyl are prepared.

Also using the above general procedure, slides coated with "Formulated films" of poly N-(2-ethylhexyl)-3,4-dioxypropylenepyrrole and a melamine crosslinked hydroxyl functional acrylic copolymer are prepared as follows:

51 pbw of the Poly ProDOP N-Ethyl Hexyl electroactive anodically coloring polymer in its neutral form is dissolved in 400 pbw toluene by stirring for 1 hour to which is added 44 pbw of a hydroxyl functional acrylic copolymer (75% active solids, hydroxyl equivalent weight=500) and 23 pbw alkoxylated methyl melamine (e.g. RESIMENE 755). The resulting solution is stirred for several hours, or overnight.

Shortly before application a sulfonic acid catalyst, 7 pbw of a 20% solution of unblocked dodecyl benzene sulfonic acid in isopropanol, is added with stirring.

100 uL of the coating is applied to a cleaned ITO/glass slide typically of dimensions 7 mm×20 mm, and of low resistivity (e.g. Delta Technologies CG-501N-CUV) via spin coating at approximately 3000 rpm for 60 seconds. Several coated slides are produced using various spin conditions in order to achieve a film thickness of approximately 1.5 microns.

The formulated and unformulated slides are then placed in a rudimentary device as described above using a 50:50 weight percent acetonitrile/water plus 0.1M Tetra butyl ammonium perchlorate as an electrolyte solution and soaked for 30 minutes.

The electroactive polymer on each slide is subjected to conditioning by cyclic voltammetry, using scan rates of 10 millivolts per second from −0.5 to +0.8 volts vs a silver wire pseudo reference electrode. Additional cyclic voltammograms are then generated at 50 mv/sec and 100 mv/sec.

Cycling lifetime is determined for each sample as described above using continuous cyclic voltammograms at 100 mv/sec for 6 hours, or until the sample fails.

Typical performance parameters and values for formulated and unformulated films are tabulated in Table 1 and Table 2.

In some instances, the parameters for the formulated samples are normalized to represent equivalent electroactive polymer content, as measured by current density, absorptivity, and film thickness.

|  | Formulated | Unformulated |
|---|---|---|
| Initial peak current At oxidation peak | 7.5 mA/cm2 | 7.5 mA/cm2 |
| Peak current after 100 cycles | 5.1 mA/cm2 | 2.7 mA/cm2 |
| # cycles to 50% Current reduction | 120 cycles | 75 cycles |

Luminance contrast is also determined before and after cycling. The using a MINOLTA CS100 color meter positioned to measure transmission through the sample of the light from a 5000K light source positioned behind the sample. Chromaticity coordinates are obtained from both a "blank" (uncoated ITO slide in sample position), and the polymer coated slide as various potentials are being applied. Luminance is defined as the "Y" coordinate of the CIE color space. Percent luminance is the ratio of the Y coordinate of the sample/Y coordinate of the blank*100. Luminance contrast is the maximum difference in percent luminance between the neutral and oxidized polymer and is a measure of the perceived contrast when corrected for the varying sensitivity of the human eye to different wavelengths.

|  | Formulated | Unformulated |
|---|---|---|
| Percent luminance of neutral polymer film Before cycling | 90 | 98 |
| Percent luminance of oxidized polymer film Before cycling | 40 | 64 |
| Luminance contrast Before cycling | 50% | 34% |
| Percent luminance of neutral polymer film after 100 cycles | 75 | 83 |
| Percent luminance of oxidized polymer film after 100 cycles | 35 | 63 |
| Luminance contrast after cycling | 40% | 20% |

It can be seen that the formulated sample maintains good contrast after cycling, while the luminance contrast of the unformulated sample significantly decreases after cycling.

Example 2

Comparison of Unformulated Poly ProDOP N-dodecyl with a Sample Formulated with a Thermoplastic (Non Crosslinking) Supporting Matrix A 5% solution of unformulated Poly(Prodop-N-Dodecyl) is prepared in toluene.

A 10% solution (5% Poly(Prodop-N-Dodecyl)/5% PARALOID B66 blend, a thermoplastic acrylic blend) is prepared in toluene.

Films of each polymer are prepared by spin casting the solutions and annealing at 140° C. for 30 minutes on a temperature controlled hot plate.

Peak absorbance values are obtained from UV-Vis spectra, and thickness and roughness values via profilometry The absorbance values were used to select films of approximately equal electroactive polymer content—i.e., films of similar absorbance values were selected for further electrochemical and color evaluations. Before performing electrochemical testing, both films were soaked for 5 minutes in acetonitrile, then air dried.

The "matched" slides coated with formulated and unformulated polymer are submitted to similar procedures described above in Example 1 using the rudimentary device and electrolyte solution of percent acetonitrile plus 0.1M Tetrabutyl ammonium perchlorate.

The electroactive polymer is subjected to conditioning by cyclic voltammetry, using scan rates of 10 millivolts per second from −0.5 to +0.8 volts vs a silver wire pseudo reference electrode. The conditioning is continued until the cyclic voltammograms overlap with repeated cycling. Additional cyclic voltammograms are then generated at 25 mv/sec and 50 mv/sec.

Absorbance and film thickness properties of the selected films:

|  | Formulated | Unformulated |
|---|---|---|
| Film thickness | 1.2 microns | 0.5 microns |
| Absorbance | 0.70 | 0.88 |

The above data indicates that the formulated film contains slightly lower electroactive polymer content than the unformulated. This should put the film at a disadvantage for color properties such as luminance contrast and color intensity. The following results indicate that, surprisingly, the color and luminance properties of the formulated sample are slightly improved over the unformulated sample.

|  | Formulated | Unformulated |
|---|---|---|
| Percent luminance of neutral polymer film | 97 | 90 |
| Percent luminance of oxidized polymer film | 50 | 60 |
| Luminance contrast | 47% | 30% |

The above data indicate improved luminance contrast achieved from a formulated film with apparently lower electroactive polymer content vs an unformulated film.

Example 3

Following the general procedure above, slides are coated with approx 0.5 microns thick unformulated films of poly N-(2-ethylhexyl)-3,4-dioxypropylenepyrrole by spray casting via air brush a 0.2% solution of the polymer in toluene is spray to an ITO/glass slide.

Slides coated with "Formulated films" of poly N-(2-ethylhexyl)-3,4-dioxypropylenepyrrole and a melamine crosslinked hydroxyl functional acrylic copolymer are prepared as follows:

50 pbw of the Poly ProDOP N-Ethyl Hexyl electroactive anodically coloring polymer in its neutral form is dissolved in 4000 pbw butyl acetate by stirring for 1 hour to which is added 44 pbw of a hydroxyl functional acrylic copolymer (75% active solids, hydroxyl equivalent weight=500) and 23 pbw alkoxylated methyl melamine (e.g. Resimene 755). The resulting solution is stirred for several hours.

Shortly before application a sulfonic acid catalyst, 12 pbw of a 10% solution of unblocked dodecyl benzene sulfonic acid in isopropanol, is added with stirring.

Approximately 1000 uL of the coating is applied to a cleaned ITO/glass slide, with typical dimensions of 7 mm×20 mm, and of low resistivity (e.g. Delta Technologies CG-501N-CUV) via spray coating via air brush. Several coated slides are produced using various amounts in order to achieve a film thickness of approximately 1.5 microns. The coated slides are annealed for 30 minutes at 120-140 C.

The formulated and unformulated slides are then placed in a rudimentary device as described above using a propylene carbonate plus 0.1M Tetra butyl ammonium perchlorate electrolyte solution and soaked for 30 minutes.

The electroactive polymer on each slide is subjected to conditioning by cyclic voltammetry, using scan rates of 10 millivolts per second from −0.5 to +0.8 volts vs a silver wire pseudo reference electrode. Additional cyclic voltammograms are then generated at 50 mv/sec and 100, 200, and 400 mv/sec.

Cycling lifetime is determined for each sample as described by application of 100 potential square waves (PSWs) with a 30 second hold time, from −0.5V to +0.8 V vs a silver wire pseudo reference electrode.

Typical performance parameters and values for formulated and unformulated films are shown in the table:

|  | Formulated | Unformulated |
|---|---|---|
| Initial peak current At oxidation peak | 1.5 mA/cm2 | 1.5 mA/cm2 |
| Peak current after Further conditioning | 1.5 mA/cm2 | Sample delaminated/dissolved |
| Peak current after 100 PSW cycles | 1.0 mA/cm2 | — |

Charge density (Q) after a number of cycles is also measured as well as for other ratios of EC polymer to matrix—e.g. 75/25, 50/50 and 25/75, and shown below. The higher the number Q reported as $(mC)/cm^2$, the more active the polymer. Excellent retention of charge density is seen especially for a ratio of 50/50 EC/binder and 25/75 EC/binder.

|  | 75/25 EC/binder | | 50/50 EC/binder | | 25/75 EC/binder | |
|---|---|---|---|---|---|---|
| PSW Cycles | Q ox | Q red | Q ox | Q red | Q ox | Q red |
| 5 | 12.9 | 10.6 | 9.0 | 5.6 | 4.6 | 2.5 |
| 30 | 11.9 | 10.0 | 8.5 | 5.4 | 4.1 | 2.6 |
| 60 | 10.2 | 8.4 | 8.3 | 5.3 | 3.9 | 2.8 |
| 90 | 6.4 | 5.2 | 7.8 | 4.9 | 3.7 | 2.9 |
| % retention at 90 Cycles | 49.6 | 49.1 | 88.6 | 88.2 | 79.8 | ~100 |

Example 4

Following the general procedure of Example 3, slides are coated using unformulated electrochomic polymer and formulated electrochromic polymer containing as the electrochromic polymer poly ProDOP N-glyme:

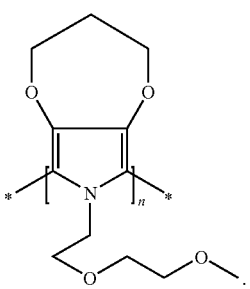

The polymer layer of the unformulated polymer coated slides are extremely soluble in electrolytes solutions in acetonitrile, propylene carbonate and mixtures of water/PEO 400, which dissolve the polymer during cycling conditions (<15 CV cycles).

Only a limited number of electrolytes could be used in switching the neat, unformulated polymer without dissolution, i.e., water/salt, e.g. KCl, Na PTSA, or PEO/Na PTSA.

Formulation of the above EC polymer with acrylic/melamine at ratios of 50:50 or 25:75 of EC:binder allows repeated switching in propylene carbonateTBAP. After 50 PSW's about 50% retention of charge density is observed.

Example 5

Following the general procedure of example 3, ITO slides are coated via spray (airbrush) at a film build of approximately 1.5 microns and cured at 120 C for 30 minutes, with formulations of acrylic/melamine and the dihydroxy polymer:

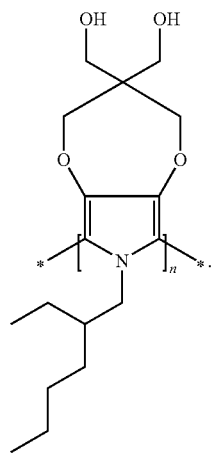

The primary hydroxyl groups are capable of reacting with the hexamethoxy methyl melamine component of the acrylic/melamine matrix system. The formulation is adjusted to accommodate the additional hydroxyl groups but keep the crosslink density and polyol/melamine ratio similar to that of a control formulation using ProDOP N-EtHx.

The slides are conditioned, via cyclic voltammetry at gradually increasing scan speeds. Color and luminance are measured after conditioning. The slides are subjected to a series of 250 potential square waves in a polycarbonate/05.1M TBAP electrolyte after which the color, luminance, and current (via CVs) were remeasured.

The film containing the possibly reactable, dihydroxy EC polymer exhibit improved retention of charge density, current density, luminance contrast, and color vs the control EC formulation.

The invention claimed is:

1. An electrochromic device comprising, as an electroactive color changing component, an anodically coloring electrochromic composition, which composition comprises an electrically active, anodically coloring polymer blended with a non-electrically conductive binder polymer in a single layer; wherein the anodically coloring polymer is a polypyrrole polymer comprising as a repeating unit a moiety with the formula

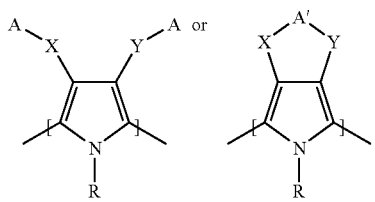

wherein X=Y=O,

R is $C_{1-24}$ alkyl or alkyl interrupted by one or more oxygen atoms or carbonyl, ester, amino or amido linkages, which alkyl or interrupted alkyl may also be substituted one or more times by one or more aromatic or heterocyclic ring, OH, OAcyl, O-alkyl, amino, amido, CN, halogen, COOH, carboxylic ester, amino salt, carboxylate salt or phosphorous salt, each A is independently H, $C_{1-24}$ alkyl or alkyl interrupted by one or more oxygen atoms or carbonyl, ester, amino or amido linkages, which alkyl or interrupted alkyl may also be substituted one or more times by one or more aromatic or heterocyclic ring, OH, OAcyl, O-alkyl, amino, amido, CN, halogen, COOH, carboxylic ester, amino salt, carboxylate salt or phosphorous salt and A' is $C_{1-6}$ alkylene or alkylene interrupted and/or substituted as for A;

wherein the non-electrically conductive binder polymer is selected from acrylate, acrylamide, polyether, polyamide, polyurethane, polyolefin, polyvinyl alcohol, fluoro polymers, styrenic, melamine and polyurethane resins and the single layer is greater than 1 micron thick and the single layer comprises a wt. ration of binder to anionically coloring polymer ranging from 75:25 to 25:75.

2. An electrochromic device according to claim 1, wherein the anodically coloring polymer is selected from anodically coloring polymers and co-polymers having a band gap >3 eV in the neutral state and oxidation potential <0.5 vs. a saturated calomel electrode.

3. An electrochromic device according to claim 1 wherein the binder polymer is obtained and blended with the anodically coloring polymer as an aqueous solution, latex or dispersion.

4. An electrochromic device according to claim 1 wherein the non-electrically conductive binder polymer is also non-ionically conductive.

5. An electrochromic device according to claim 1, wherein the binder polymer is selected from crosslinked acrylate, acrylamide, and polyvinyl alcohol polymers.

6. An electrochromic device according to claim 1, which also comprises a cathodically coloring component.

7. An electrochromic device according to claim 6, wherein the cathodically coloring component comprises an electroactive, cathodically coloring polymer.

8. An electrochromic device according to claim 7, wherein the cathodically coloring component comprises a polythiophene, alkyl substituted polythiophene alkoxy or dialkoxy substituted thiophene polymer.

9. A method for preserving breadth of color space and, or, intensity of color strength of an anodically coloring electrochromic composition comprising an anodically coloring polymer, which method composition comprises blending the anodically coloring polymer with a non-electrically conductive binder polymer in a single layer; wherein the anodically coloring polymer is a polypyrrole polymer comprising as a repeating unit a moiety with the formula

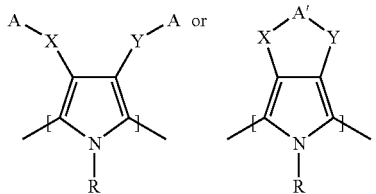

wherein X=Y=O,

R is $C_{1-24}$ alkyl or alkyl interrupted by one or more oxygen atoms or carbonyl, ester, amino or amido linkages, which alkyl or interrupted alkyl may also be substituted one or more times by one or more aromatic or heterocyclic ring, OH, OAcyl, O-alkyl, amino, amido, CN, halogen, COOH, carboxylic ester, amino salt, carboxylate salt or phosphorous salt, each A is independently H, $C_{1-24}$ alkyl or alkyl interrupted by one or more oxygen atoms or carbonyl, ester, amino or amido linkages, which alkyl or interrupted alkyl may also be substituted one or more times by one or more aromatic or heterocyclic ring, OH, OAcyl, O-alkyl, amino, amido, CN, halogen, COOH, carboxylic ester, amino salt, carboxylate salt or phosphorous salt and A' is $C_{1-6}$ alkylene or alkylene interrupted and/or substituted as for A;

wherein the non-electrically conductive binder polymer is selected from the group of acrylate, acrylamide, polyether, polyamide, polyurethane, polyolefin, polyvinyl alcohol, fluoro polymers, styrenic, melamine and polyurethane resins; and the single layer is greater than 1 micron thick and the single layer comprises a wt. ratio of binder to anionically coloring polymer ranging from 75:25 to 25:75.

10. A method according to claim 9, wherein the anodically coloring polymer is selected from anodically coloring polymers and co-polymers having a band gap >3 eV in the neutral state and oxidation potential <0.5 vs a saturated calomel electrode.

11. A method according to claim 9, wherein the binder is crosslinked styrenic, melamine, acrylate, acrylamide, polyurethane, polyvinyl alcohol, and fluoro polymers.

12. A method according to claim 11, wherein the thermoset is selected from crosslinked acrylate, acrylamide and polyvinyl alcohol polymers.

13. A method according to claim 9, wherein the non-electrically conductive binder polymer is also non-ionically conductive.

14. The electrochromic device according to claim 1, wherein the binder is hydroxyl functionalized acrylic polymer crosslinked with melamine.

* * * * *